United States Patent [19]
Cons

[11] Patent Number: 5,809,814
[45] Date of Patent: Sep. 22, 1998

[54] KEYHOLDER SYSTEM

[76] Inventor: David A. Cons, 2845 W. Muriel Dr., Phoenix, Ariz. 85023

[21] Appl. No.: 679,844

[22] Filed: Jul. 15, 1996

[51] Int. Cl.$^6$ .................................................. A44B 15/00
[52] U.S. Cl. ................................. 70/457; 40/330; 70/459
[58] Field of Search .................................. 70/456 R–460; 40/330, 634

[56] References Cited

U.S. PATENT DOCUMENTS

| | | | |
|---|---|---|---|
| 2,457,195 | 12/1948 | Bagnall, Jr. | 70/457 X |
| 2,631,449 | 3/1953 | Protsman | 70/457 |
| 3,183,612 | 5/1965 | Romaine | 40/649 X |
| 3,201,885 | 8/1965 | Sasich | 40/330 |
| 3,225,478 | 12/1965 | Rohmer | 40/330 |
| 4,224,815 | 9/1980 | Aiken | 70/457 |
| 4,349,975 | 9/1982 | Chubb | 40/330 |
| 4,417,410 | 11/1983 | Freedom | 40/330 |
| 5,113,602 | 5/1992 | Levine et al. | 40/330 X |
| 5,138,855 | 8/1992 | Faris | 70/457 |
| 5,572,186 | 11/1996 | Traxler et al. | 340/426 |

*Primary Examiner*—Suzanne Dino
*Attorney, Agent, or Firm*—Martin L. Stoneman

[57] ABSTRACT

A keyholder is described having a soft nylon cord, looped to hold keys, with both ends of the nylon loop capturable in a cord capture device. The cord capture is of the type which permits passing of the cord through aligned holes in a casing and in a button in the casing, where the button compresses a spring to align the holes. When the button/spring is released, any cord segment in the cord capture is prevented from movement through the holes. One end of the nylon cord has a clip on it to prevent that end from passing through the cord capture; and advertising indicia may be put on a surface attached to the clip. A preferred method for making the keyholder is described, including protecting the cord ends from fraying.

20 Claims, 2 Drawing Sheets

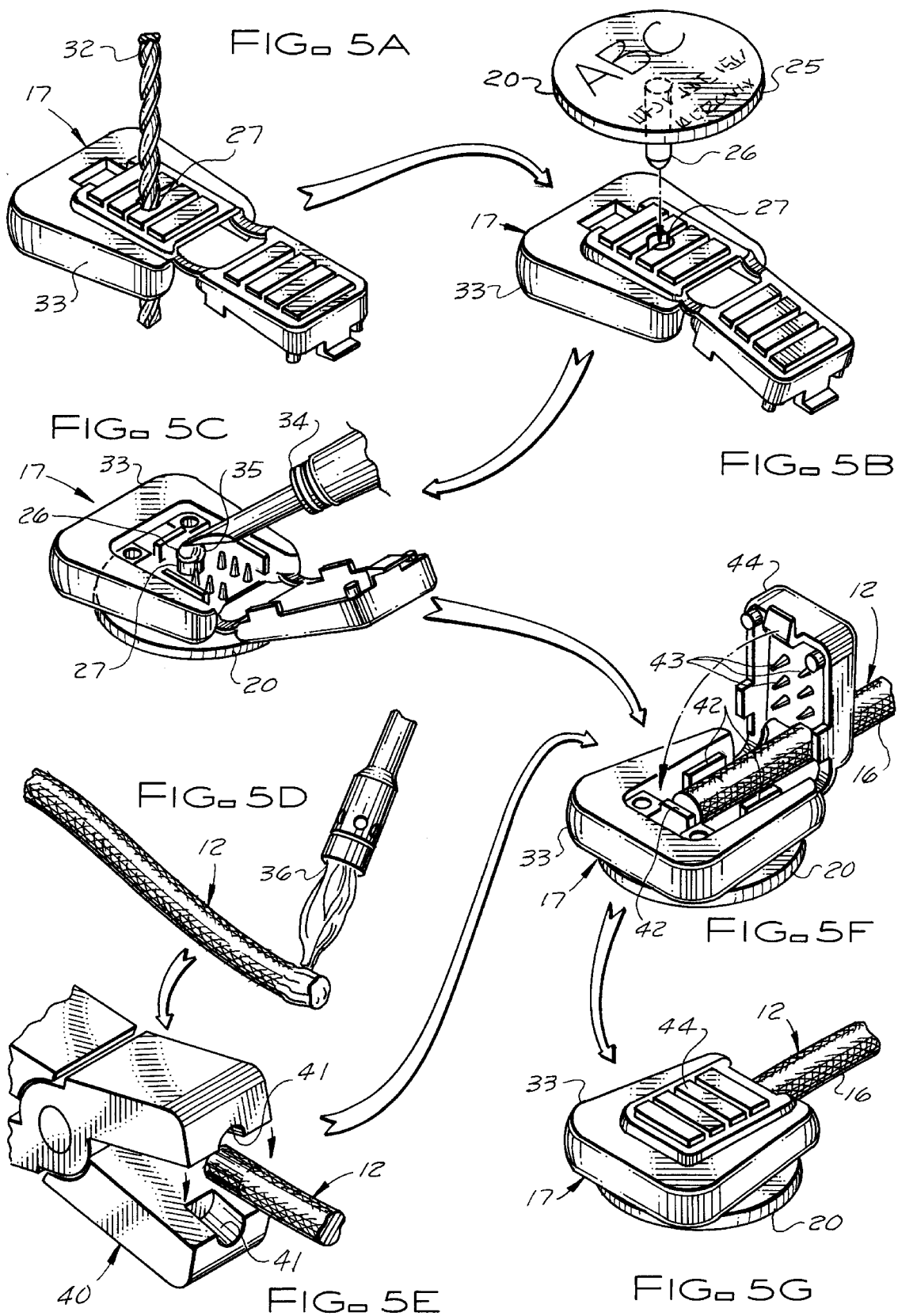

KEYHOLDER SYSTEM

BACKGROUND OF THE INVENTION

1. Field of the Invention

This invention relates to providing an improved keyholder system. More particularly, this invention concerns such a keyholder system wherein the ends of a looped cord for holding keys are captured, thus preventing unwanted removal of the keys.

2. Description of the Prior Art

Typically, in the prior art, keyholders are made of rigid materials, usually in the form of a metal circle having enough elasticity to get the keys on and off and/or to retain the ends of such circle. Also, sometimes keyholders have been made of metal pullchains (formed of a connected row of metal balls) with the ends held by a retaining device to catch a ball at either end of the chain. There have been many problems in using keyholder system of the prior art, most notably: the usual lack of a sufficiently secure method of avoiding the loss of a key; the usual lack of an efficient system for removing or replacing keys on the keyholder, e.g., without dropping them and/or without having unusual agility or strength; and the usual lack of ability to get the right key in an efficient position for use without interference from other keys or the keyholder. Thus there are needs for an improved keyholder system.

OBJECTS OF THE INVENTION

A primary object of the present invention is to fulfill the above-mentioned needs by the provision of an improved keyholder system. A further primary object of the present invention is to provide such a keyholder system which is efficient, inexpensive, and handy. Other objects of this invention will become apparent with reference to the following invention descriptions.

SUMMARY OF THE INVENTION

According to a preferred embodiment of the present invention, this invention provides a keyholder system for keys comprising, in combination: cord means, having a first end and a second end, for passing through at least one such key; cord capture means, having a first position and a second position, for releasably capturing such cord means near such first end and for releasing and recapturing of such cord means near such second end of such cord means while maintaining capture of such cord means near such first end of such cord means; whereby a releasable loop is provided in such cord means for holding at least one such key. Also provided is such keyholder system wherein: such first position of such cord capture means permits movement of such cord means through such cord capture means; and such second position of such cord capture means prevents movement of such cord means through such cord capture means; and, further, wherein such cord capture means comprises compressible spring means wherein such spring means is compressed when such cord capture means is in such first position, and such spring means is uncompressed when such cord capture means is in such second position.

Moreover, the present invention provides such keyholder system further comprising: obstruction means at such first end of such cord means for preventing such first end of such cord means from movement through such cord capture means; and, further, comprising advertising means on such obstruction means for providing viewable indicia; and, further, wherein such obstruction means comprises hinged clip means for closing about and firmly holding such first end of such cord means; and, further, wherein such advertising means comprises a golf-ball-marker-type device having a flat surface and a stem, wherein such stem is attached to such hinged clip means.

Additionally, this invention provides such a keyholder system further comprising obstructive means at such first end of such cord means for assisting in such maintaining capture of such first end of such cord means in such cord capture means. It also provides such a keyholder system wherein such second end of such cord means comprises an anti-fraying structure; and, further, wherein such cord means comprises woven strands of nylon; and, further, wherein such second end of such cord means comprises an anti-fraying structure wherein such woven strands of nylon at such second end of such cord means are sealed together; and, further, wherein such woven strands of nylon are heat-sealed together at each such end of such cord means.

Even further, this invention provides, in accordance with a preferred embodiment thereof, a keyholder system for keys comprising, in combination: a cord comprising woven strands of nylon, having a first end and a second end, structured and arranged for passing through at least one such key; a cord capture, having a first position and a second position, structured and arranged for releasably capturing such cord, wherein such first position of such cord capture permits movement of such cord through such cord capture, and such second position of such cord capture prevents movement of such cord through such cord capture; wherein such cord capture includes a compressible spring wherein such spring is compressed when such cord capture is in such first position, and such spring is uncompressed when such cord capture is in such second position; a hinged clip structured and arranged for closing about and firmly holding such first end of such cord, such clip being further structured and arranged for preventing such first end of such cord from movement through such cord capture; a golf-ball-marker-type device having a flat surface and a stem, such stem being attached to such clip, and such flat surface comprising advertising means providing viewable indicia; wherein such woven strands of nylon are heat-sealed together at each such end of such cord; and, further, wherein a color of a such cord is selectable to distinguish a first such keyholder system from an other such keyholder system.

This invention also provides, according to a preferred embodiment thereof, a keyholder system comprising the manufacturing steps of: providing a hinged clip, having a main body and a closing body, structured and arranged for closing about and firmly holding a first end of a cord; providing a golf-ball-marker-type plastic device having a flat surface and a cylindrical stem, such flat surface comprising advertising means providing viewable indicia; drilling a hole through such main body of such hinged clip, such hole having essentially the diameter of such cylindrical stem; pushing such stem through such main body in such manner that a tip of such stem extends from the inside of such main body of such hinged clip; and melting such tip of such stem to harden formed as a knob attaching such device to such main body. And this invention provides such a keyholder system further comprising the steps of: providing a cord comprising woven strands of nylon, having a first end and a second end, structured and arranged for passing through at least one key; flame-heating such first end of such cord to soften such first end; while such first end is softened, applying external pressure to such first end in such manner as to heat-seal together such woven strands of nylon at such first end.

Yet additionally, this invention provides such a keyholder system further comprising the steps of: placing such heat-sealed first end of such cord into such hinged clip; and closing such hinged clip in such manner as to firmly hold such first end of such cord; and, further, comprising the steps of: flame-heating such second end of such cord to soften such second end; and while such second end is softened, applying external pressure to such second end in such manner as to heat-seal together such woven strands of nylon at such second end. And it also provides such a keyholder system further comprising the steps of: providing a cord capture, having a first position and a second position, structured and arranged for releasably capturing such cord, wherein such first position of such cord capture permits movement of such cord through such cord capture, and such second position of such cord capture prevents movement of such cord through such cord capture; and wherein such cord capture includes a compressible spring wherein such spring is compressed when such cord capture is in such first position, and such spring is uncompressed when such cord capture is in such second position; and compressing such spring and, while such spring is compressed, moving such second end of such cord through such cord capture to form a keyholder loop for passing through and holding at least one key; and, further, comprising the steps of maintaining such keyholder loop by compressing such spring and, while such spring is compressed, moving such second end of such cord back through such cord capture sufficiently to maintain a desired size of such keyholder loop; and uncompressing such spring whereby such desired size of keyholder loop is maintained.

BRIEF DESCRIPTION OF THE DRAWINGS

FIG. 5 (FIGS. 5A through 5G) is a series of seven perspective views detailing a preferred method of manufacturing the keyholder system of the present invention.

DETAILED DESCRIPTION OF A PREFERRED EMBODIMENT AND THE BEST MODE OF PRACTICE

Figure 1:
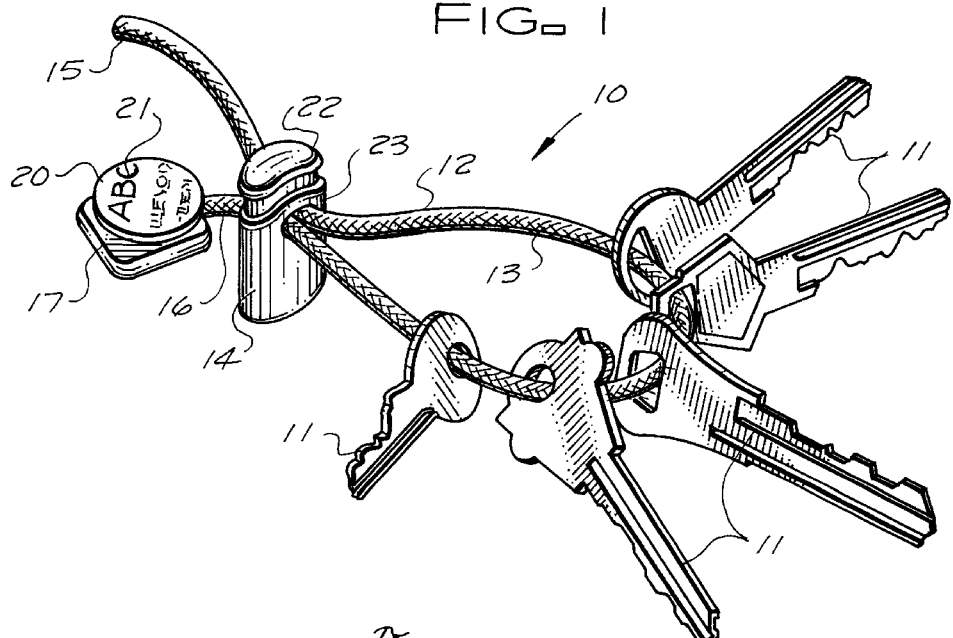
FIG. 1 is a perspective view of a keyholder system according to a preferred embodiment of the present invention in use holding keys.

FIG. 1 illustrates a preferred embodiment of the keyholder system of the present invention, embodied by a keyholder 10, shown containing an assortment of keys 11. The keys 11 represent those which a person would typically carry on such person for house, automobile, office, etc. The keys 11 are securely held by cord means, having a first end (16) and a second end (15), for passing through at least one such key 11, such cord means being embodied by a cord 12. Cord 12 is maintained in the form of a loop 13 by cord capture means, having a first position and a second position, for releasably capturing such cord means near such first end and for releasing and recapturing of such cord means near such second end of such cord means while maintaining capture of such cord means near such first end of such cord means, such cord capture means being embodied by releasable cord capture 14 (herein later more particularly described).

Figure 2:
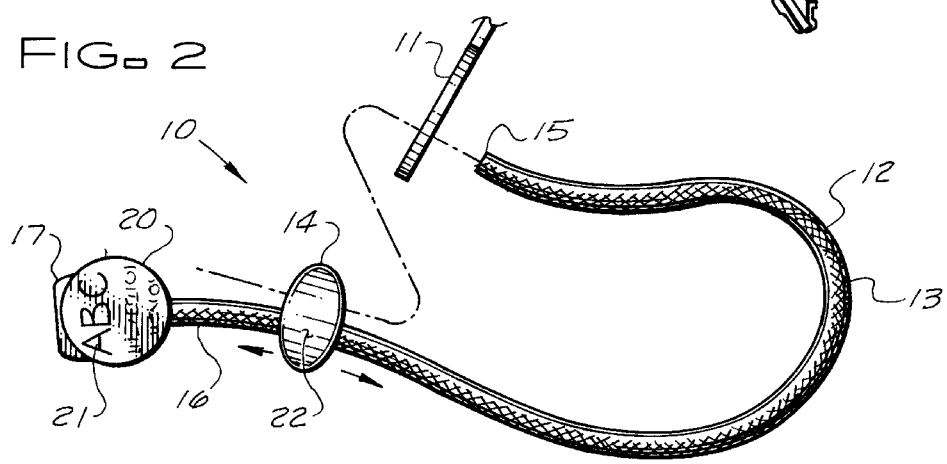
FIG. 2 is a top plan view of the illustrated preferred keyholder while attaching a key.

Both the free end 15 and clip end 16 of cord 12 normally pass through cord capture 14. And such ends preferably have an anti-fraying structure, preferably as later discussed with reference to FIG. 5. Permanently attached to the clip end 16 of cord 12 is obstruction means for preventing such first (clip) end of such cord means from movement through such cord capture means, such obstruction means being embodied by end clip 17. Thus end clip 17 serves to prevent the clip end 16 of cord 12 from being pulled through cord capture 14 when the cord capture 14 is released. Additionally the end clip 17 serves to provide a mounting for advertising means on such obstruction means for providing viewable indicia, such advertising means being embodied by message disk 20. The message 21 of message disk 20 may be in the form of a product or service advertisement or any other written message or design. A primary feature of keyholder 10 is its ability to allow quick, easy release of the free end 15 of cord 12, which in turn opens the loop 13 for removal or installation of keys 11 as shown in plan view in FIG. 2. Additionally, the loop 13 is infinitely adjustable in size, providing for any desired quantity of keys 11, from one to many. The loop 13 of cord 12, may also be easily looped around other objects, such as a purse handle or belt, so that the keyholder 10, with its keys 11, may be carried in a manner preventing loss or theft.

Figure 3:
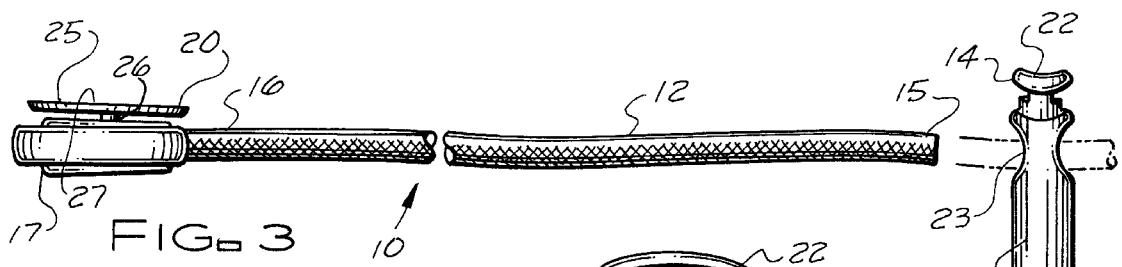
FIG. 3 is a side elevation view of the illustrated keyholder, disassembled.

As will be seen, the cord capture means of this invention has two positions wherein: such first position of such cord capture means permits movement of such cord means through such cord capture means; and such second position of such cord capture means prevents movement of such cord means through such cord capture means. The opening of the cord 12 loop 13 is accomplished by compressing compressible spring means, embodied by spring loaded button 22 (using spring 31) of cord capture 14, and pulling the free end 15 of cord 12 out of the hole 23 of the cord capture 14. This is further illustrated in FIGS. 2, 3 and 4. Hole 23 is sized to accept two sections of cord 12, so that both the free end 15 and clip end 16 of cord 12 may be secured by the cord capture 14 in its normal gripping state, and in turn, the grip on both the free end 15 and clip end 16 is released when button 22 is depressed. The clip end 16 of cord 12 may not be pulled through and out of the hole 23 of cord capture 14 because of the restraint of the end clip 17. It is seen that any amount of loop 13 may be adjustably positioned through the hole 23 of cord capture 14 to result in a varying length of cord keyholder portion.

The cord 12 of keyholder 10 is preferably made of about-one-eighth-inch-diameter woven nylon cord, and preferably of moderately flexible, 500 lb. test, climbers' accessory cord with a preferred length of about seven inches. This specific type of cord is available in a variety of colors and color patterns which may be used to advantage in providing a keyholder 10 which is easily seen, or may be distinguished from a keyholder 10 of different color or color pattern. This may be useful in identifying different sets of keys on different keyholders 10.

To prevent the free end 15 of cord 12 from fraying and unraveling with use, it is prepared by melting and reforming. The end clip 17 embodies hinged clip means for closing about and firmly holding such first end of such cord means and preferably is a nylon tab (of the illustrated type) which is snapped to the clip end 16 of cord 12. It is preferably a ZIPCORD (™) brand part number 643-0000, modified by the attachment of the message disk 20 embodying a golf-ball-marker-type device having a flat surface and a stem wherein such stem is attached to such hinged clip means. The message disk 20 is a common plastic golf ball marker comprised of a flat disk 25, preferably approximately ¾ "in diameter, with a round pin 26 projecting from its underside, as shown. Round pin 26 of message disk 20 is permanently inserted within hole 27 of end clip 17.

Figure 4:
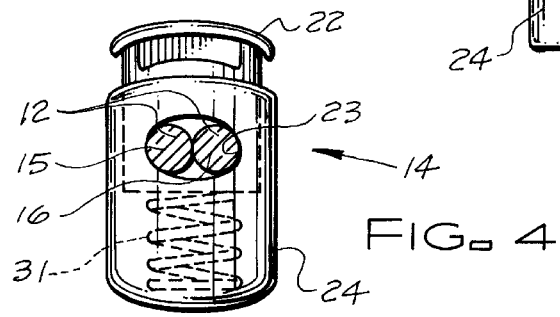
FIG. 4 is a side elevation view of the cord lock.

The cord capture 14 is preferably an ELLIPSE (™) brand part number 350-0000, is plastic, and is of the type illustrated in FIG. 4. Hole 23, of cord capture 14, is sized for two passes of cord 12 and extends through the body end 24 and button 22. When button 22 is depressed, hole 23 through button 22 and corresponding hole 23 through body end 24 are aligned for easy insertion of cord 12; and this position permits movement through cord capture 14. When button 22 is released, spring 31 pushes button 22 upward, mis-aligning holes 23 and firmly grasping the two passes of cord 12 (free end 15 and clip end 16), thus preventing the movement of cord 12 through cord capture 14. Unintentional release of the gripping of cord 12 by accidental bumping of button 22 is eliminated by the strong pressure of spring 31. When depressing button 22 to release cord 12, the body end 24 must also be held.

FIGS. 5A through 5G illustrate in perspective views a preferred method of manufacture of a preferred embodiment of the keyholder 10 by modification and assembly of the components of which it is composed. Per FIG. 5A, end clip 17 is modified by the drilling of hole 27. A twist drill 32 of appropriate size (approx. 3/32 "diam.) is used to drill hole 27 through the main body 33 of end clip 17 for the subsequent attachment of a message disk 20. The hole 27 is approximately centrally located and perpendicular to the flat face of the main body 33 of end clip 17.

As shown in FIG. 5B, the round pin 26 on the underside of disk 25 of the message disk 20 is inserted into hole 27 of end clip 17. The relationship between the diameters of hole 27 and round pin 26 is such that when the disk 25 of message disk 20 is in contact with the end clip 17, it will be held snugly in position.

Per FIG. 5C, the assembled end clip 17 and message disk 20 are shown inverted, and the protruding exposed end of round pin 26 is melted, as shown, preferably with a soldering iron 34, forming knobular lump 35 when cool again. This knobular lump 35 prevents the round pin 26 of the message disk 20 from being able to be pulled out of the hole 27 of the end clip 17. This completes the modification and sub-assembly of the end clip 17 and the message disk 20.

Both ends of cord 12 are treated to prevent fraying and unraveling. This process requires heating of the nylon of which the cord 12 is constructed, to soften it, and then reforming to seal the woven strands of nylon to each other. In FIG. 5D, an end of cord 12 is heated with the flame of torch 36 until the material becomes softer and more plastic in consistency, but not burning. While the nylon at the end of the cord 12 is still thus hot and plastic, it is reformed as shown in FIG. 5E. Special forming pliers 40 with two half-round forms 41, squeeze the end of cord 12, forming it into accurate round shape with a blunt end.

An end clip 17 is now attached to one end, the clip end 16, of cord 12. In FIG. 5F is shown the clip end 16 of cord 12 inserted into the main body 33 of end clip 17. Locators 42 are provided in the interior of the end clip 17 for the proper positioning of cord 12, in addition to the positioning from the grippers 43 for retention of the cord 12. After positioning of cord 12, the lock plate 44 portion of the end clip 17 is hinged into the main body 33 until locked in place in the main body 33 and crimped against the cord 12. The completed attachment of the end clip 17, with its integral message disk 20, attached to cord 12 is shown in FIG. 5G, completing the clip end 16 of cord 12, with the opposite end, the free end 15, available for installing by passing through a cord capture 14.

Thus as disclosed hereinabove the keyholder system of this invention comprises the manufacturing steps of: providing a hinged clip, having a main body and a closing body, structured and arranged for closing about and firmly holding a first end of a cord; providing a golf-ball-marker-type plastic device having a flat surface and a cylindrical stem, such flat surface comprising advertising means providing viewable indicia; drilling a hole through such main body of such hinged clip, such hole having essentially the diameter of such cylindrical stem; pushing such stem through such main body in such manner that a tip of such stem extends from the inside of such main body of such hinged clip; melting such tip of such stem to harden formed as a knob attaching such device to such main body; providing a cord comprising woven strands of nylon, having a first end and a second end, structured and arranged for passing through at least one key; flame-heating such first end of such cord to soften such first end; while such first end is softened, applying external pressure to such first end in such manner as to heat-seal together such woven strands of nylon at such first end; placing such heat-sealed first end of such cord into such hinged clip; closing such hinged clip in such manner as to firmly hold such first end of such cord; flame-heating such second end of such cord to soften such second end; while such second end is softened, applying external pressure to such second end in such manner as to heat-seal together such woven strands of nylon at such second end; providing a cord capture, having a first position and a second position, structured and arranged for releasably capturing such cord, wherein such first position of such cord capture permits movement of such cord through such cord capture, and such second position of such cord capture prevents movement of such cord through such cord capture, and wherein such cord capture includes a compressible spring wherein such spring is compressed when such cord capture is in such first position, and such spring is uncompressed when such cord capture is in such second position; and compressing such spring and, while such spring is compressed, moving such second end of such cord through such cord capture to form a keyholder loop for passing through and holding at least one key; maintaining such keyholder loop by compressing such spring and, while such spring is compressed, moving such second end of such cord back through such cord capture sufficiently to maintain a desired size of such keyholder loop; and uncompressing such spring whereby such desired size of keyholder loop is maintained.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A keyholder system for keys comprising, in combination:
   a. cord means, having a first end and a second end, for passing through at least one said key;
   b. cord capture means, having a first position and a second position, for releasably capturing said cord means near said first end and for releasing and recapturing of said cord means near said second end of said cord means while maintaining capture of said cord means near said first end of said cord means;
   c. whereby a releasable loop is provided in said cord means for holding at least one said key;

d. wherein said first position of said cord capture means permits movement of said cord means, both near said first end and near said second end, through said cord capture means; and e. wherein said second position of said cord capture means entirely prevents movement of said cord means through said cord capture mean.

2. A keyholder system according to claim 1 further comprising:

a. obstruction means at said first end of said cord means for preventing said first end of said cord means from movement through said cord capture means.

3. A keyholder system according to claim 2 further comprising:

a. advertising means on said obstruction means for providing viewable indicia.

4. A keyholder system according to claim 3 wherein said obstruction means comprises hinged clip means for closing about and firmly holding said first end of said cord means.

5. A keyholder system according to claim 4 wherein said advertising means comprises:

a. a golf-ball-marker-type device having a flat surface and a stem;

b. wherein said stem is attached to said hinged clip means.

6. A keyholder system according to claim 1 further comprising:

a. obstructive means at said first end of said cord means for assisting in said maintaining capture of said first end of said cord means in said cord capture means.

7. A keyholder system according to claim 1 wherein said second end of said cord means comprises an anti-fraying structure.

8. A keyholder system according to claim 1 wherein said cord means comprises woven strands of nylon.

9. A keyholder system according to claim 8 wherein said second end of said cord means comprises an anti-fraying structure wherein said woven strands of nylon at said second end of said cord means are sealed together.

10. A keyholder system according to claim 9 wherein said woven strands of nylon are heat-sealed together at said second end of said cord means in such manner as to allow a non-obstructed passage through said cord capture means.

11. A keyholder system according to claim 1 wherein said cord capture means, when in said second position, is constructed and arranged to simultaneously capture said cord means at spaced multiple locations along said cord means, whereby the size of said loop may be modified.

12. A keyholder system according to claim 11 wherein said cord capture means comprises compressible spring means wherein:

a. said spring means is compressed when said cord capture means is in said first position; and b. said spring means is uncompressed when said cord capture means is in said second position.

13. A keyholder system for keys comprising, in combination:

a. a cord comprising woven strands of nylon, having a first end and a second end, structured and arranged for passing through at least one said key;

b. a cord capture, having a first position and a second position, structured and arranged for releasably capturing said cord, wherein i. said first position of said cord capture permits movement of said cord through said cord capture, and ii. said second position of said cord capture prevents movement of said cord through said cord capture;

c. wherein said cord capture includes a compressible spring wherein:

i. said spring is compressed when said cord capture is in said first position, and ii. said spring is uncompressed when said cord capture is in said second position;

d. a hinged clip structured and arranged for closing about and firmly holding said first end of said cord, said clip being further structured and arranged for preventing said first end of said cord from movement through said cord capture;

e. a golf-ball-marker-type device having a flat surface and a stem, said stem being attached to said clip, and said flat surface comprising advertising means providing viewable indicia;

f. wherein said woven strands of nylon are heat-sealed together at each said end of said cord.

14. A keyholder system according to claim 13 wherein a color of a said cord is selectable to distinguish a first said keyholder system from an other said keyholder system.

15. A keyholder system comprising the manufacturing steps of:

a. providing a hinged clip, having a main body and a closing body, structured and arranged for closing about and firmly holding a first end of a cord;

b. providing a golf-ball-marker-type plastic device having a flat surface and a cylindrical stem, said flat surface comprising advertising means providing viewable indicia;

c. drilling a hole through said main body of said hinged clip, said hole having essentially the diameter of said cylindrical stem;

d. pushing said stem through said main body in such manner that a tip of said stem extends from the inside of said main body of said hinged clip; and e. melting said tip of said stem to harden formed as a knob attaching said device to said main body.

16. A keyholder system according to claim 15 further comprising the steps of:

a. providing a cord comprising woven strands of nylon, having a first end and a second end, structured and arranged for passing through at least one key;

b. flame-heating said first end of said cord to soften said first end;

c. while said first end is softened, applying external pressure to said first end in such manner as to heat-seal together said woven strands of nylon at said first end.

17. A keyholder system according to claim 16 further comprising the steps of:

a. placing said heat-sealed first end of said cord into said hinged clip; and b. closing said hinged clip in said manner as to firmly hold said first end of said cord.

18. A keyholder system according to claim 17 further comprising the steps of:

a. flame-heating said second end of said cord to soften said second end; and b. while said second end is softened, applying external pressure to said second end in said manner as to heat-seal together said woven strands of nylon at said second end.

19. A keyholder system according to claim 18 further comprising the steps of:

a. providing a cord capture, having a first position and a second position, structured and arranged for releasably capturing said cord, wherein i. said first position of said cord capture permits movement of said cord through said cord capture, and
  ii. said second position of said cord capture prevents movement of said cord through said cord capture; and wherein said cord capture includes a compressible spring wherein:
  iii. said spring is compressed when said cord capture is in said first position, and
  iv. said spring is uncompressed when said cord capture is in said second position; and
b. compressing said spring and, while said spring is compressed, moving said second end of said cord through said cord capture to form a keyholder loop for passing through and holding at least one key.

20. A keyholder system according to claim 19 further comprising the steps of:
  a. maintaining said keyholder loop by
    i. compressing said spring and, while said spring is compressed, moving said second end of said cord back through said cord capture sufficiently to maintain a desired size of said keyholder loop; and
    ii. uncompressing said spring whereby said desired size of keyholder loop is maintained.

\* \* \* \* \*